United States Patent [19]

Kaneko et al.

[11] Patent Number: 5,166,816
[45] Date of Patent: Nov. 24, 1992

[54] LIQUID CRYSTAL DISPLAY PANEL WITH REDUCED PIXEL DEFECTS

[75] Inventors: Setsuo Kaneko; Osamu Sukegawa, both of Tokyo, Japan

[73] Assignee: NEC Corporation, Japan

[21] Appl. No.: 695,260

[22] Filed: May 31, 1991

Related U.S. Application Data

[63] Continuation of Ser. No. 442,773, Nov. 29, 1989, abandoned.

[30] Foreign Application Priority Data

Nov. 30, 1988 [JP] Japan ................................ 63-304383
Dec. 12, 1988 [JP] Japan ................................ 63-313341

[51] Int. Cl.$^5$ ......................... G02F 1/13; H01L 27/12
[52] U.S. Cl. ........................................ 257/59; 359/54; 257/72; 257/632
[58] Field of Search ................. 359/59, 54, 87; 357/23.7, 4

[56] References Cited

U.S. PATENT DOCUMENTS

| | | | |
|---|---|---|---|
| 4,666,253 | 5/1987 | Yoshida | 350/334 |
| 4,705,358 | 11/1987 | Yamazaki et al. | 350/334 |
| 4,778,258 | 10/1988 | Parks et al. | 350/336 |
| 4,821,092 | 4/1989 | Noguchi | 350/336 |
| 4,855,806 | 8/1989 | Parks et al. | 350/336 |
| 5,003,356 | 3/1991 | Wakai et al. | 350/336 |

FOREIGN PATENT DOCUMENTS

| | | |
|---|---|---|
| 267824 | 5/1988 | European Pat. Off. |
| 3714164 | 11/1987 | Fed. Rep. of Germany |
| 0103210 | 5/1988 | Japan ........................... 350/336 |
| 0068728 | 3/1989 | Japan ........................... 357/23.7 |
| 0253715 | 10/1989 | Japan ........................... 350/336 |

OTHER PUBLICATIONS

Applied Physics, vol. 24, pp. 357-362, 1981.
SID 88 Digest pp. 310-313, 1981.
H. Moriyama, H. Uchida, S. Nichida, H. Nakano, Y. Hirai, S. Kaneko, C. Tani "12-in. Full-Color a Si:H TFT-LCD with Pixel Electrode Buried in Gate Insulator," *SID 89 Digest*, pp. 145-147.

*Primary Examiner*—Rolf Hille
*Assistant Examiner*—Tan Ho
*Attorney, Agent, or Firm*—Ostrolenk, Faber, Gerb & Soffen

[57] ABSTRACT

The liquid crystal display panel has a glass substrate, a plurality of rows of gate electrode provided on the glass substrate, a plurality of columns of drain electrode provided on the glass substrate, a plurality of pixel electrodes provided corresponding to each of the intersections of a matrix formed by the gate electrodes and the drain electrodes, a first and second insulating films that are provided between the gate electrodes, the drain electrodes, and the pixel electrodes in order to isolate them with each other, and a plurality of thin film transistors in which drains are connected to the drain electrodes and sources are connected to each of the plurality of pixel electrodes.

5 Claims, 4 Drawing Sheets

LIQUID CRYSTAL DISPLAY PANEL WITH REDUCED PIXEL DEFECTS

This is a continuation of application Ser. No. 07/442,773 filed on Nov. 29, 1989 now abandoned.

BACKGROUND OF THE INVENTION

1. Field of the Invention

The present invention relates to a liquid crystal display panel, and more particularly to a liquid crystal display panel with reduced pixel defects.

2. Description of the Related Art

In recent years, research and development has been pursued actively on liquid crystal displays which make it possible to reduce the thickness of the display panel. In particular, the active matrix addressing method using thin film transistors has been the object of research in view of its potential as a method which is capable of preventing the occurrence of the contrast deterioration problem in liquid crystal displays and enables the creation of a display with a large number of scanning lines (namely, a large capacity).

In applying thin film transistors to a liquid crystal display, it becomes necessary to form a thin film transistor array with satisfactory yield at low cost. In so doing, it is desirable to give the simplest possible structure to the thin film transistor.

As the thin film semiconductor material for the thin film transistor, use is usually made of amorphous silicon, polycrystalline silicon, cadmium sulfide or the like. In FIG. 1 is shown a sectional view of a thin film display as disclosed in Applied Physics, Vol. 24, pp. 357-362, 1981 for the case of using amorphous silicon as the thin film semiconductor material. In this structure, both a gate electrode 21 and a pixel electrode 23 are formed into an island pattern on the same glass substrate 20. This thin film transistor (TFT) element has a gate insulating film 30 formed so as to cover both the gate electrode 21 and the pixel electrode 23, an islandlike semiconductor film 25, a source electrode 29 electrically connected to the pixel electrode 23, and a drain electrode 28 which serves as a signal line.

Further, another structure used for the liquid crystal display which is disclosed in Society of Information Display (SID), p. 310, 1988 is shown in FIG. 2. This transistor includes first and second insulating films 22 and 24 formed so as to cover a gate electrode 21 provided on a glass substrate 20, a semiconductor film 25 formed into an island pattern on the second insulating film 24, and source and drain electrodes 29 and 28 that are electrically connected respectively to source and drain regions 27 formed on the semiconductor film 25. A pixel electrode 23 is formed on the second insulating film 24 to be connected with the source electrode 29. Reference numeral 26 is a protective film.

In the transistor structures shown above, the structure shown in FIG. 1, for example, is designed so as to avoid bringing the gate electrode 21 and the pixel electrode 23 into electrical contact on the glass substrate 20. Further, the structure shown in FIG. 2 is designed so as to avoid the electrical contact between the drain electrode 28 and the pixel electrode 23 in the same plane, as is indicated in the explanatory diagram shown in FIG. 3. However, in the manufacturing process of the transistor array, electrical contact tends to be formed between the gate electrode 21 and the pixel electrode 23 or between the drain electrode 28 and the pixel electrode 23, because of dust that strays into the device during the photoresist process or the like. When such a contact takes place, it is represented as a point defect in the picture display, which becomes a cause for the deterioration in the yield.

SUMMARY OF THE INVENTION

It is, therefore, an object of the present invention to provide a liquid crystal display panel which is capable of reducing the defects in the picture display and producing a high yield with a simple construction.

The liquid crystal display panel according to the present invention includes a substrate and a plurality of pixel elements formed on the substrate in a matrix form, each of the pixel elements having a gate electrode formed on the substrate, a first insulating film provided covering the gate electrode, a pixel electrode provided on or above the first insulating film, a semiconductor layer provided on or above the first insulating film directly above the gate electrode, source and drain regions formed in the semiconductor layer on both sides of the gate electrode, a first electrode connected to one of the source region and the drain region, a second insulating film provided between the pixel electrode and the semiconductor layer, a hole provided in the second insulating film, and a second electrode that connects the pixel element and the other of the source and the drain regions via the hole.

The first electrode that is connected to one of the source and drain regions, the gate electrode, and the pixel electrode are mutually insulated by means of the first and the second insulating films. Therefore, even when the gate electrode or the first electrode protrudes over the pixel electrode due to dust or the like, which entered into the device during the photoresist process, it will not lead to a picture defect because these electrodes are isolated by the first and the second insulating films. In addition, the structure of the device according to the present invention is such that the increase in the number of fabrication steps over that of the conventional structure is only slight. Therefore, it becomes possible to obtain a thin film transistor array with low cost and high yield.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

First Embodiment

Figure 3:
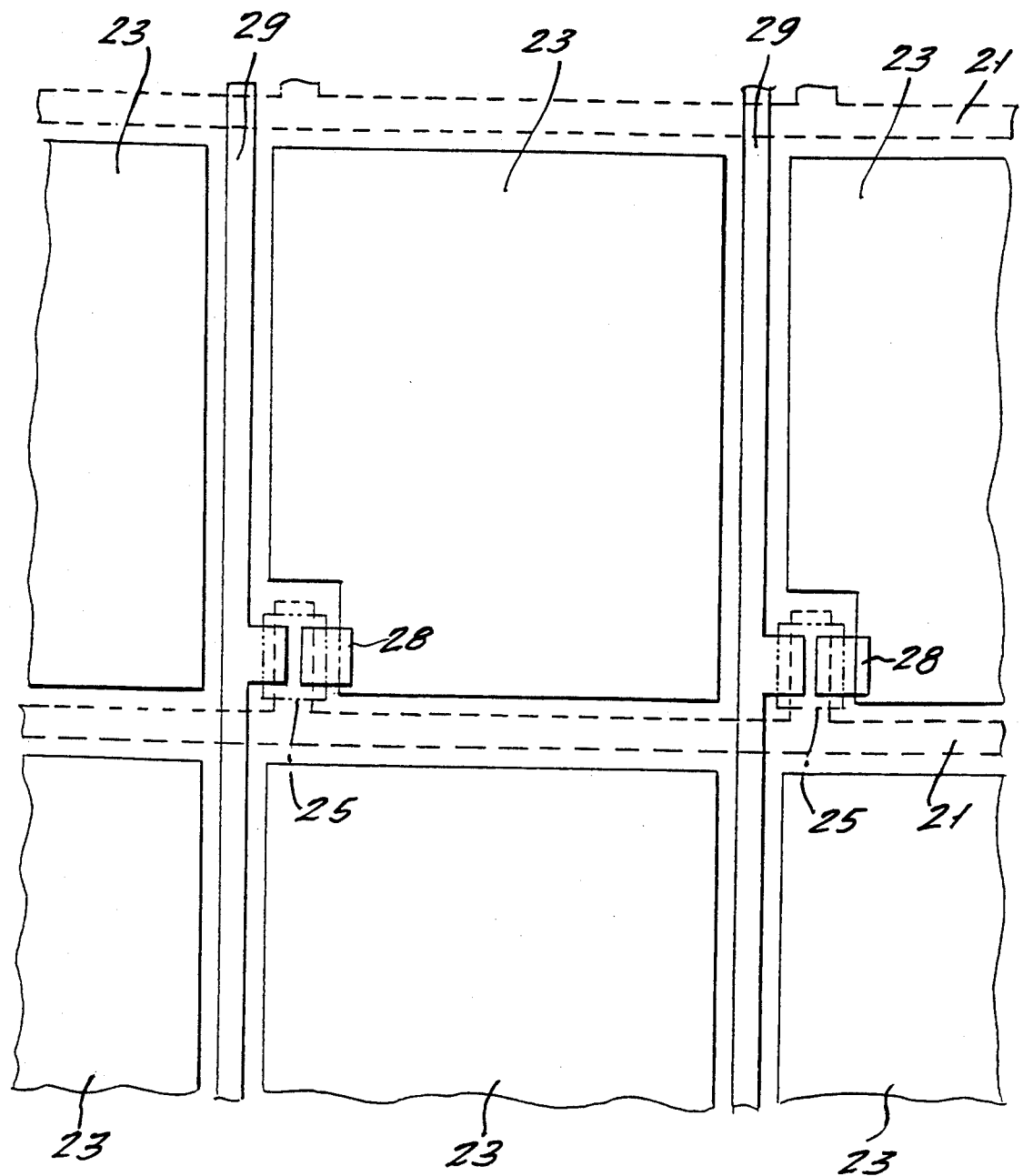
FIG. 3 is a plan view for explaining both the liquid crystal display panels of the prior art and the present invention.

Referring to FIG. 3 again, a plurality of rows of gate electrodes 21 and a plurality of columns of drain electrodes 29 are formed. A plurality of pixel electrodes 23 are formed corresponding to each intersection of a matrix formed by the gate electrodes 21 and the drain electrodes 29.

Figure 4:
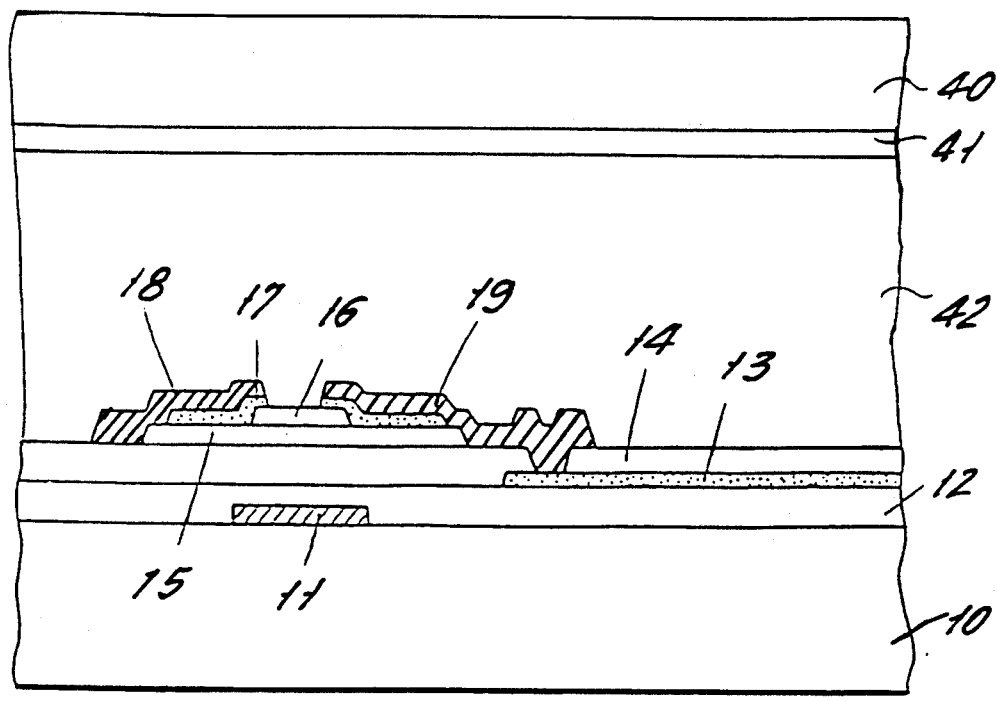
FIG. 4 is a sectional view for explaining a first embodiment of the present invention.

Referring to FIG. 4, first, chromium is deposited to a thickness of 100 nm on a glass substrate 10, and a gate electrode 11 is formed by patterning the film into island form. Subsequently, after forming a 150 nm thick $SiO_x$ film as a first insulating film 12, indium tin oxide is formed to a thickness of 100 nm which is patterned into island form to create a pixel electrode 13. Then, 300 nm of $SiN_x$ as a second insulating film 14, 100 nm of amorphous silicon as a semiconductor layer 15, and 100 nm of $SiN_x$ as a protective film 16 are formed sequentially by a plasma CVD method at a temperature of about 250° C. Further, after patterning the protective film 16 into island form, an $n^+$-type amorphous silicon layer doped with an impurity such as phosphorus which serves as a source and drain region 17 is formed to a thickness of 40 nm, and the layer is patterned to avoid electrical contact between the source region and the drain region. Then, after patterning the amorphous silicon layer into island form, a contact hole is opened at a part in the second insulating film 14 over the pixel electrode 13. The contact hole is created by a dry etching using $CF_4$. Thereafter, chromium is formed to a thickness of 200 nm as the metal for source and drain electrodes, and patterned so as to establish an electrical contact between the pixel electrode 13 and a source electrode 19 via the contact hole and to ensure the electrical isolation between the source electrode 19 and a drain electrode 18, completing the fabrication of the thin film transistor. Then, an upper glass substrate 40 having a transparent electrode 41 thereon is formed above the glass substrate 10. A liquid crystal 42 is inserted between the pixel electrode 13 and the transparent electrode 41.

Figure 1:
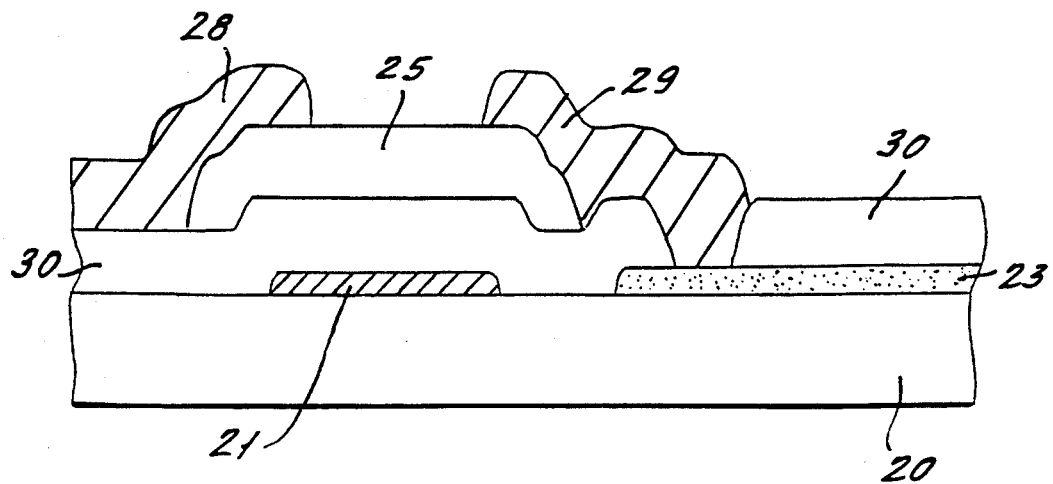
FIGS. 1 and 2 are sectional views of the thin film transistors of the prior art.
Figure 2:
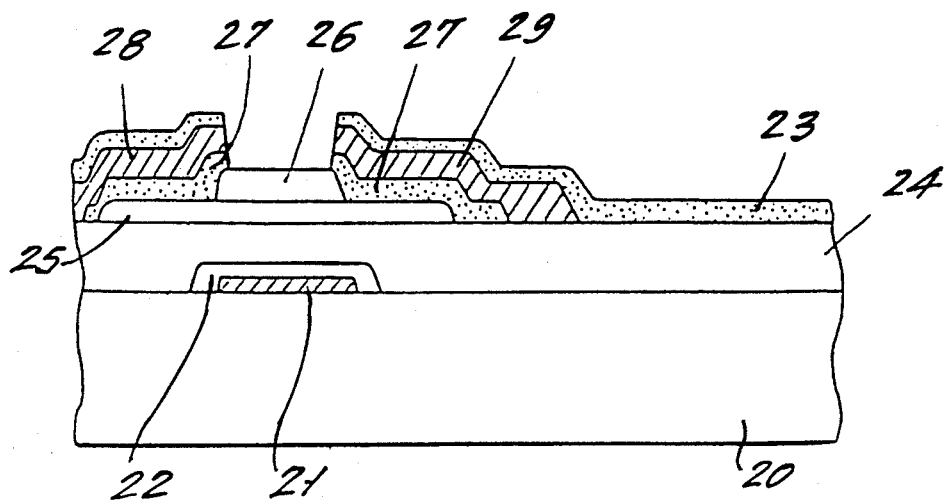

It should be pointed out that although the first insulating film 12 was formed covering the entire surface in the present embodiment, the film may be formed limited only to the vicinity of the gate electrode as shown in FIG. 2. In that event, the pixel electrode will be formed on the glass substrate.

In the thin film transistor of the present embodiment, a structure is employed in which the protective film 16 is formed directly above the channel section that is formed in the amorphous silicon layer 15 directly above the gate electrode 11. However, the present invention also operates effectively in a structure where the protective film 16 is missing. In that case, the fabrication process differs slightly from that of the present embodiment, requiring the etching of the $n^+$-type amorphous silicon layer. Moreover, although amorphous silicon is used as the thin film semiconductor in the thin film transistor of the present embodiment, the present invention will also remain effective even when other semiconductors such as polycrystalline silicon and cadmium sulfide are employed.

In the present embodiment, the pixel electrode 13, the drain electrode 18 and the gate electrode 11 are isolated from one another by the insulating films 12 and 14, so that the number of pixel defects due to short-circuiting between these electrodes are reduced, yet the structure is simple. The number of occurrences of point defects was evaluated by actually forming a liquid crystal display having a thin film transistor array of the present embodiment and carrying out a picture display. The result of the evaluation showed that in contrast to an average number of defect occurrences of 5 per 100 $cm^2$ in the prior structure, it was improved to an average value of 0.2 in the liquid crystal display using the transistor array of the present structure, confirming that the effect of the present invention is conspicuous.

Second Embodiment

Figure 5:
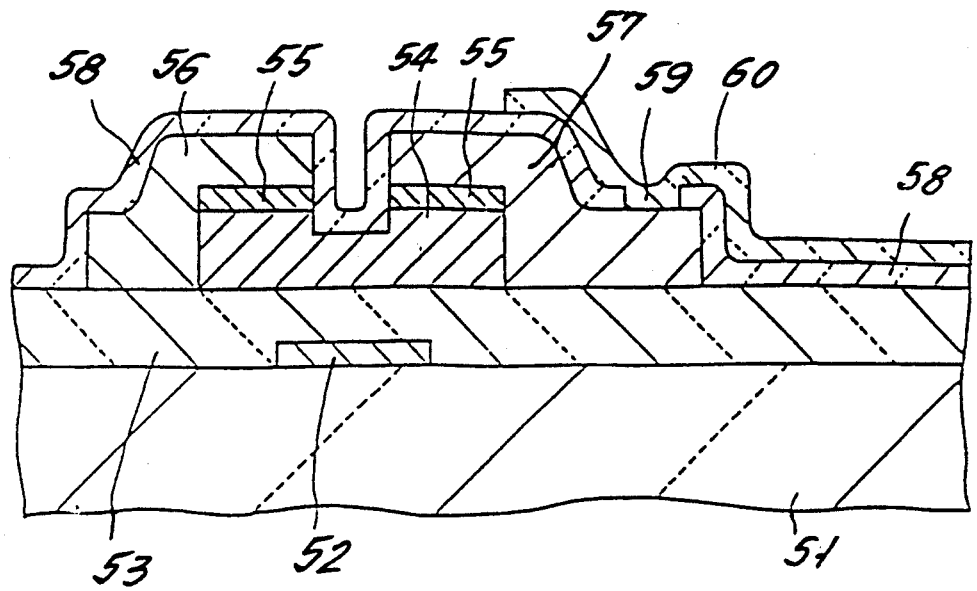
FIG. 5 is a sectional view for explaining a second embodiment of the present invention.

FIG. 5 is a schematic vertical sectional view showing important parts of a second embodiment of the present invention, by taking out one unit of thin film transistor.

In a liquid crystal display panel equipped with a plurality of thin film transistor films arranged in array form and a plurality of pixel electrode 60 that are connected respectively to the thin film transistors, the present embodiment has a silicon nitride ($SiN_x$) film 58 provided as an interlayer insulating film on a source electrode 57 and a drain electrode 56 of the thin film transistor, and the source electrode 57 and the pixel electrode 60 are connected via an opening section 59 provided in the silicon nitride film 58.

In addition, in FIG. 5, 51 is a glass substrate, 52 is a gate electrode, 53 is an insulating film, 54 is an i-a-Si (intrinsic amorphous silicon) layer, and 55 is an $n^+$-a-Si ($n^+$-amorphous silicon) layer. An upper glass substrate, a transparent electrode on the upper glass substrate, and a liquid crystal, though they are not shown, are also formed as described in the first embodiment.

One of the features of the present embodiment resides in the provision of the silicon nitride film 58 having an opening section 59.

The method of fabrication of the present embodiment will be described next.

The gate electrode 52 is formed on the glass substrate 51, and 3000 Å of silicon nitride film 53 as a gate insulating film, 3000 Å of the i-a-Si layer 54 as a transistor layer, and 500 Å of the $n^+$-a-Si layer 55 as an ohmic contact layer are formed respectively. Next, the i-a-Si layer 54 and the $n^+$-a-Si layer 55 are removed except for the transistor part, and 3000 Å of chromium which is to become the drain electrode 56 and the source electrode 57 is formed by sputtering and then patterned. Then, 1000 Å of silicon nitride film 58 is formed as the interlayer insulating film, an opening section 59 is formed by etching, and 800 Å of ITO (indium tin oxide) film is formed by sputtering, and then patterned into a pixel electrode 60.

According to the present embodiment the silicon nitride film 58 exists between the drain electrode 56 and the pixel electrode 60, and an electrical short-circuiting between these electrodes will not occur even when there exists a defect in photolithography.

Third Embodiment

Figure 6:
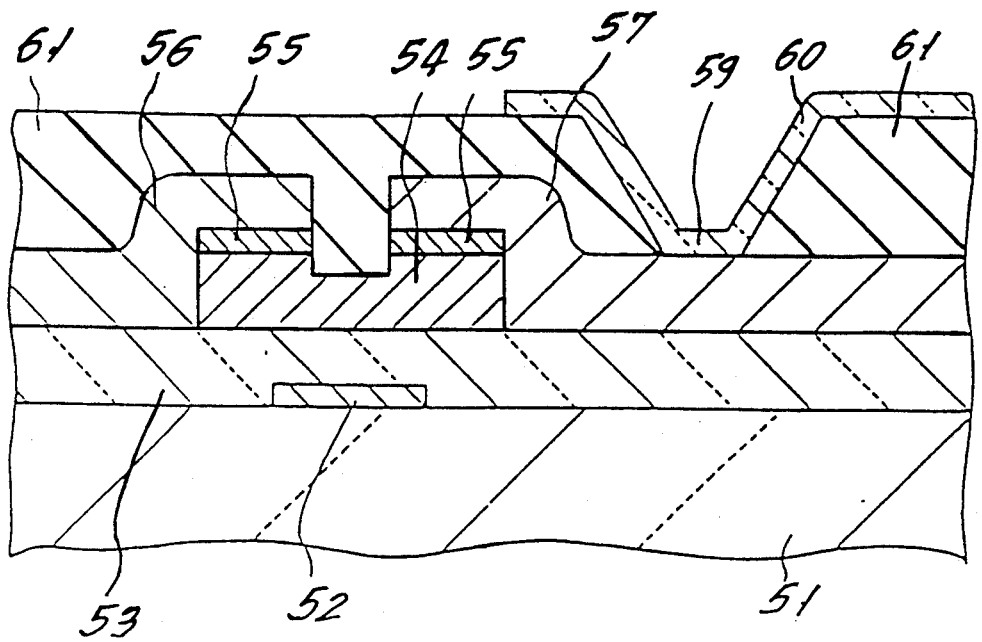
FIG. 6 is a sectional view for explaining a third embodiment of the present invention.

FIG. 6 is a schematic vertical section view showing important parts of a third embodiment of the present invention.

In the present embodiment, the interlayer insulating film is formed with a polyimide film 61, and the source electrode 57 and the pixel electrode 60 are connected via the opening section 59.

One of the features of the present embodiment resides in the fact that the polyimide film 61 with the opening section 59 is provided.

The present embodiment can be fabricated in the same manner as in the second embodiment by forming the polyimide film 61 in place of the silicon nitride film 58.

The present embodiment has an advantage that the surface of the thin film transistor array can be made flat so that the gap control and the orientation control in the formation of the liquid crystal panel are facilitated.

It should be noted that although the description been given above is based on the connection formed between the pixel electrode and the source electrode as an example, a similar effect can be realized for the case of connecting the pixel electrode and the drain electrode.

What is claimed is:

1. A liquid crystal display panel comprising:
   a substrate; and
   a plurality of pixel elements formed on said substrate in a matrix form, each of said pixel elements having:
   a gate electrode provided on said substrate,
   a first insulating film provided covering said gate electrode,
   a pixel electrode provided on said first insulating film,
   a semiconductor layer provided on said first insulating film directly above said gate electrode,
   a source region and a drain region formed in said semiconductor layer on both sides of said gate electrode,
   a first electrode connected to one of said source region or said drain region,
   a second insulating film provided on said pixel electrode but under said semiconductor layer,
   a hole provided in said second insulating film, and
   a second electrode connecting the other of said source region or said drain region and said pixel electrode through said hole.

2. A liquid crystal display panel as claimed in claim 1, wherein said substrate is a glass substrate, said first insulating film is a silicon oxide or a silicon nitride film, said semiconductor layer is an amorphous silicon layer, and said second insulating film is a silicon nitride film.

3. A liquid crystal display panel as claimed in claim 1, wherein said substrate is a glass substrate, said semiconductor layer is an amorphous silicon layer, and said second insulating film is a polyimide film.

4. A liquid crystal display panel comprising:
   a substrate;
   a plurality of rows of gate electrodes provided on said substrate;
   a plurality of columns of one of source electrodes and drain electrodes provided above said substrate;
   a plurality of pixel electrodes provided above said substrate corresponding respectively to each of the intersections of a matrix formed by said plurality of rows of gate electrodes and said plurality of columns of said one of source electrodes and drain electrodes;
   a first insulating film provided between said plurality of rows of gate electrodes and said plurality of pixel electrodes;
   a second insulating film provided between said plurality of pixel electrodes and said plurality of columns of said one of source electrodes and said drain electrodes;
   a plurality of holes provided in said second insulating film; and
   a plurality of semiconductor layers provided above said second insulating film above respective ones of said plurality of rows of gate electrodes, each of said plurality of semiconductor layers having a source region and a drain region on respective sides of a respective gate electrode, respective ones of said source regions and said drain regions being connected to corresponding ones of said source electrodes and said drain electrodes, a source electrode and a drain electrode being associated with each pixel electrode, and each of said plurality of semiconductor layers being connected to a respective pixel electrode by further connecting a respective one of said source electrode and said drain electrode to said pixel electrode through a respective hole in said second insulating film.

5. A liquid crystal display panel as claimed in claim 4, wherein said substrate is a glass substrate, said first insulating film is a silicon oxide, said second insulating film is a silicon nitride, and said semiconductor layer is an amorphous silicon layer.

* * * * *